Nov. 2, 1971  H. A. RUNDELL  3,616,695
APPARATUS FOR CONVERTING A PULSATING PNEUMATIC
SIGNAL TO A PEAK-HOLDING SIGNAL
Filed Feb. 10, 1970
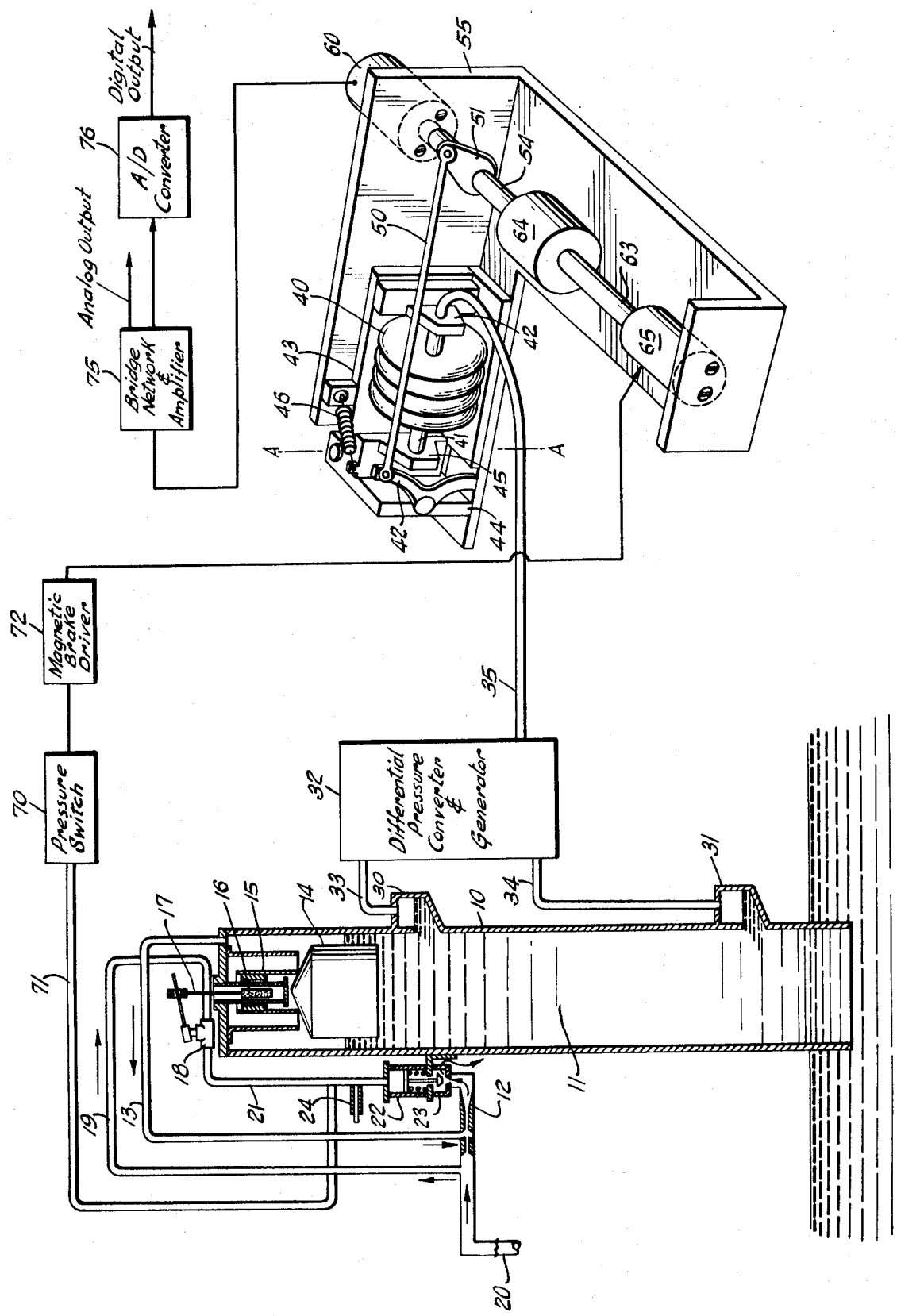

United States Patent Office

3,616,695
Patented Nov. 2, 1971

3,616,695
APPARATUS FOR CONVERTING A PULSATING PNEUMATIC SIGNAL TO A PEAK-HOLDING SIGNAL
Herbert A. Rundell, Houston, Tex., assignor to Texaco Inc., New York, N.Y.
Filed Feb. 10, 1970, Ser. No. 10,160
Int. Cl. G01n 9/12; G01l 7/00
U.S. Cl. 73—438                              8 Claims

ABSTRACT OF THE DISCLOSURE

Disclosed is apparatus usable in connection with a borehole drilling fluid density measuring device for converting a pulsating pneumatic signal to a peak-holding signal including a pressure sensing cell for converting the pneumatic signal to mechanical movement of a reciprocating nature, a first shaft coupled with the cell through a movement multiplication linkage adapted to provide angular displacements of the first shaft corresponding to the pneumatic signal, the coupling being adapted to permit the shaft to retain its position during declining periods of the pneumatic signal, a second shaft, a friction clutch coupling the first and second shafts, a return spring urging the first shaft through the linkage to rotate in a downward direction, means including a pressure switch for providing a peak-identifying signal when the pneumatic signal attains each peak and for providing a decline identifying signal when each peak commences its decline, and a magnetic brake coupled to the second shaft for holding it fixed in response to the peak-identifying signal and for releasing it in response to the decline identifying signal. The apparatus further includes output signal generating means for providing an output signal corresponding to the position of the first shaft.

BACKGROUND OF THE INVENTION

This invention relates to an apparatus for peak-holding a pulsating pneumatic signal and more particularly to an improved apparatus for converting a pulsating pneumatic signal of variable frequency and amplitude to a peak-holding signal.

There are various sensing instruments for sensing physical properties of materials which provide a pulsating output signal in which the heights of the pulses quantitatively represent the sensed property. Typical of such instruments are those which repeatedly sample the material test in a batch manner such as a process gas chromatograph. An example of a sensing instrument which provides a pulsating pneumatic output signal is a borehole drilling fluid density measuring device of the batch sampling type. In this device the density of successive batches of the drilling fluid is sensed by drawing each batch into a chamber and sensing its static pressure at two vertically separated points. The pressure varies as the fluid enters and leaves the chamber while the output signal continuously represents the sensed pressure. Accordingly, the output is in the form of a pulsating signal in which the peaks only represent the actual density of each batch of fluid. The output is a pneumatic signal and is conventionally recorded on a strip chart where the peaks can be observed and interpreted. A major disadvantage of this output signal is that only the peaks carry valid information and the signal is erroneous at other times.

For the purpose of computer control or electronic monitoring of the drilling operation it is important to have a mud density signal which is valid essentially at all times. The invention and improvements as herein disclosed provide a peak-holding signal which is essentially a continuously valid indication of the drilling mud density. Also, the invention can be used in connection with peak-holding of any pneumatic signal rendering such signals amenable to analog or digital monitoring by computer.

SUMMARY

In accordance with one aspect of the invention there is provided an apparatus for converting a pulsating pneumatic signal to a peak-holding signal which includes, pressure responsive means for sensing the pneumatic signal including a first movable member whose position is responsive to the instantaneous value of the pneumatic signal, whereby the first movable member is caused to move in accordance with the inclining and declining periods of the pneumatic signal, a second movable member mechanically coupled with the first movable member for receiving a positional displacement corresponding to the pneumatic signal wherein the mechanical coupling joining the first and second movable members is adapted to permit the second movable member freedom to maintain its position when the pulsating pneumatic signal is in its declining period, and spring return means mechanically coupled with the second movable member tending to urge its movement in a direction corresponding to a declining value of the pneumatic signal. The apparatus also includes signal providing means responsive to the pulsating pneumatic signal for providing a peak identifying signal when the pneumatic signal attains its peak value and for providing a decline identifying signal prior to substantial decline of the pneumatic signal from its peak value, and means responsive to the signal providing means for successively holding fixed and releasing the second movable member; these means are adapted to hold fixed the second movable member in response to the peak decline identifying signal until a subsequent peak identifying signal occurs and are adapted to release the second movable member in response to the latter signal until a subsequent peak decline identifying signal occurs. Accordingly, the second movable member is always in a position corresponding to the last peak of the pneumatic signal. Thus, when a subsequent peak is lower than a preceding peak the position of the second movable member is held until the aforementioned releasing occurs and then the return means causes the second movable member to assume a new position corresponding to the new lower peak. When the subsequent peak exceeds the value of the earlier peak the second movable member is urged to a position corresponding to the higher peak which it holds until the aforementioned releasing occurs. The apparatus further includes output signal generating means mechanically coupled to the second movable member for generating an output signal corresponding to the position of this member. Accordingly, the output signal continually holds the peaks of the pulsating pneumatic signal.

In a further embodiment of the apparatus the output signal generating means includes a potentiometer coupled to a regulated voltage source for providing an electrical analog signal corresponding to the held peaks. In yet another embodiment an analog to digital converter is added for converting the electrical analog signal to a digital signal which is thus amenable to monitoring by digital computer.

In view of the foregoing it is an object of the invention to provide apparatus for converting a pulsating pneumatic signal to a peak-holding signal.

Another object of the invention is to provide an apparatus for converting a pulsating pneumatic signal to a peak-holding signal in electrical analog form.

Another object of the invention is to provide apparatus for converting a pulsating pneumatic signal to a peak-holding signal in digital form.

Another object of the invention is to provide an improvement of a borehole drilling fluid density measuring apparatus for converting its pulsating pneumatic output signal to an output in the form of a peak-holding signal.

These and other objects, advantages and features of the invention will be more fully understood by referring to the following description and claims taken in conjunction with the accompanying drawing.

BRIEF DESCRIPTION OF THE DRAWING

The only appended drawing is a composite illustration, partly in block diagram form, showing a simplified cross-sectional view of a typical mud weight measuring device and a perspective view of apparatus illustrating features of the invention.

DESCRIPTION OF THE PREFERRED EMBODIMENTS

Referring now to the drawing there is illustrated in simplified form a typical batch-type drilling mud density measuring unit 10, which includes a chamber 11, open at its lower portion. The lower portion is partially submerged in the drilling mud pit associated with the borehole drilling facility. The density measuring unit periodically draws a sample of the mud by a pneumatic actuated system. A source of pneumatic air pressure of about 60 p.s.i.g., is provided, not shown. An air jet aspirator 12 is provided connected with the source of pneumatic pressure by a conduit 20. Connected with the throat of the air jet aspirator is a conduit 13 which is in turn connected with the top of the chamber 11. As a stream of air passes through the aspirator at high velocity a partial vacuum is created at its throat which in turn lowers the pressure at the top of the chamber 11 and the drilling mud is drawn up into the chamber until it is filled. A float 14 is provided which rises in the chamber along with the level of the drilling mud.

A ring magnet 15 is axially mounted in the upper portion of the chamber in a manner permitting free vertical movement thereof. A cylindrical magnet 16 is externally mounted axially aligned with the ring magnet 15 and oriented in a manner such that movement of the ring magnet urges similar movement of the cylindrical magnet. The upper portion of the cylindrical magnet 16 terminates in a push rod 17 which operates the activating arm of a toggle valve 18. One side of the toggle valve is connected to a conduit 19 which is in turn connected to the inlet conduit 20 of the air jet aspirator 12. The other side of the toggle valve 18 is connected by a conduit 21 to a pneumatic timing device which includes an air piston 22, a spring valve 23, and an adjustable bleed provision 24 connected in the conduit 21. The seat end of the spring valve 23 is connected to the outlet of the air jet aspirator 12, and the air piston 22 is connected to the conduit 21.

The spring valve 23 is spring loaded in the open direction and is arranged in a manner such that on its seat side it is exposed to the pressure at the outlet of the air jet aspirator and on its spring side it is exposed to the force exerted by the air piston 22 corresponding to the pressure in the conduit 21. Just above the seat there is provided an exhaust opening so that the stream of air from the air jet aspirator passing through the seat of the valve 23, when it is open, can exhaust therefrom.

The operation of the unit is as follows. Initially the toggle valve 18 is in the closed condition, that is, having its actuating arm in the down position thereby preventing any air flow from the conduit 19 to the conduit 21. Thus the pneumatic pressure source at the conduit 20 results in a jet of air passing through the air jet aspirator 12 and through the seat of the spring valve 23 the spring holding it in an open position. This air jet causes a decline in pressure at the throat of the air jet aspirator 12 which is carried along through the conduit 13, and the ambient air pressure outside of the chamber causes the mud level to rise in the chamber 11. When the chamber is filled the float 14 raises the ring magnet 15 and by means of its magnetic coupling with the cylindrical magnet 16, the push rod 17 opens the toggle valve 18. Thereupon, the pressure in the conduit 20 and conduit 19, is immediately transmitted to the conduit 21. This causes the spring valve 23 to assume its closed position being driven by the air piston 22. As the spring valve 23 closes, the inlet stream passing through the air jet aspirator is diverted to pass through its throat and into the conduit 13 from whence it passes into the upper portion of the chamber 11 causing the mud therein to be discharged. As the mud level declines from its maximum the float drops and permits the cylindrical magnet 16 to restore the toggle valve 18 to its closed position trapping in the conduit 21 a predetermined volume of air at a pressure in the vicinity of the pressure of the pneumatic source.

The valve 23 remains closed as long as the pressure in the air piston 22 is great enough to provide a closing force greater than the force exerted by the spring of the valve 23. Also, as long as the valve 23 remains closed the chamber 11 continues to discharge its contents. The adjustable bleed provision 24 bleeds the air from the conduit 21 gradually declining the pressure in the air piston 22. This adjustment is calibrated such that the bleeding in the conduit 21, prior to reopening of the spring valve 23, takes place over a time interval sufficient to empty the chamber 11. Thus, when the pressure in the conduit 21 declines sufficiently, the spring valve 23 reopens permitting the air jet aspirator to draw a new charge of mud into the chamber 11 thereby repeating the charge and discharge cycles.

The chamber 11 is fitted with upper and lower differential pressure sensing ports 30 and 31, respectively, which are connected with a differential pressure converter and generator 32 by conduits 33 and 34, respectively. During each cycle of operation the differential pressure between these ports initially starts at zero when the mud level is below the lower port 31, then it increases as the mud level rises between the ports and it attains a maximum value when the mud level reaches the upper port 30. Mud level above the upper port have no further effect on the sensed differential pressure. It can be seen that during the emptying phase of the operating cycle the sensed differential pressure declines as the mud level declines. Thus, when the unit is operated continuously from sample to sample, the sensed differential pressure is in the form of a plurality of pulses wherein only the peak height of each pulse represents the density of each specific mud sample. The reason is that the peak occurs when the mud level is above the upper sensing port and only then can the density be related to the sensed differential pressure between these sensing ports of specific vertical separation.

The differential pressure converter and generator 32 converts the sensed pulsating differential pressure to a pulsating pneumatic signal in the range of approximately 3 to 15 p.s.i.g. The differential pressure converter and generator 32 is a conventional pressure converter incorporating a force balancing device which is driven by the sensed differential pressure and which operates a pneumatic flapper-nozzle.

The output of the differential pressure converter 32 is transmitted by a conduit 35 to a conventional expansion-type pressure sensing cell assembly 40 which converts the pulsating pneumatic signal to reciprocating linear movement of a push rod 41 incorporated on the movable left portion of the pressure sensing cell 40. The right portion of the pressure sensing cell is fixed to a plate 42 which is in turn fixed to a frame 43. Pivotally mounted to the frame 43 is a channeled arm 44 which includes an extending plate 45 designed to contact the push rod 41. The pivotal axis of the arm 44 is designated A and is arranged approximately transverse to the line of movement of the push rod 41 so that the reciprocating linear movement of the push rod tends to impart a corresponding angular movement to the arm 44. A return spring 46 is provided having one end fixed to the frame 43 and the other end fixed to the arm 44 and applies a spring force to the arm 44 in a direction tending to keep the extending plate 45 in contact with the push rod 41. When the pulsating pneumatic signal is in its inclining period the push rod 41 moves to the left urging angular movement to the left of the arm 44 about its pivotal axis A. When the pneumatic signal is in its declining period the return spring 46 tends to urge movement of the arm 44 in the opposite direction.

There is provided a connecting link 50 having its left end pivotally mounted to the channeled arm 44 at a greater distance from the pivoted axis A than is the line of movement of the push rod 41. The connecting link 50 is positioned approximately parallel to the line of movement of the push rod so that linear movement of the push rod results in a corresponding movement of the connecting link 50 which is nearly linear but magnified by comparison with the linear movement of the push rod. The right end of the connecting link 50 is pivotally connected with an arm 51 fixed to a first shaft 54, which is in turn pivotally mounted in a housing 55, in which is also mounted the frame 43 containing the pressure sensing cell.

The far end of the first shaft 54 is coupled to a conventional potentiometer 60 which is mounted in the housing 55. The near end of the shaft 54 is coupled to one end of a second shaft 63 by a conventional friction clutch 64. The other end of the second shaft 63 is fixed to the movable rotor of a conventional magnetic brake 65 which is in turn fixed to the housing 55.

To identify when each peak of the pneumatic signal occurs and to identify when the signal is about to decline from each respective peak value a pressure switch 70, is provided, which is coupled to the conduit 21, by a conduit 71. As the mud level in the chamber 11 increases to its maximum point the toggle valve 18 is opened and the pressure in the conduit 21 is suddenly increased to a value approximately equal to the source pressure. As the mud level declines from its maximum value, the toggle valve 18 is closed as discussed above. At that moment, the pressure in the conduit 21 starts to decline since the toggle valve 18 is closed and the bleed provision 24 begins bleeding the contents of the conduit 21. This occurs before the mud level drops to the upper sensing port 30, and accordingly, the output pneumatic signal is still at its peak value. The pressure switch 70 is calibrated to close its electrical contacts at a pressure just below the source pressure such as exits in the conduit 21 immediately before the mud level declines to the upper sensing port 30. Thus, the pressure switch 70 closes its contacts when the toggle valve 18 is actuated to its open position and keeps the contacts closed until just prior to a decline of the mud level to the upper sensing port 30. Accordingly, the contact closure of the pressure switch 70 constitutes a peak identifying signal designating when the pneumatic output of the density unit attains a peak value, and the opening of the pressure switch 70 constitutes a peak decline identifying signal which designates that the pneumatic signal is about to decline from its peak value.

A magnetic brake driving circuit 72 is provided to respond to the contact closure of the pressure switch 70 for driving the magnetic brake 65 to its "on" condition when the pressure switch contacts are open and for turning it "off" when the contacts are closed. When it is in the "on" condition it holds fixed the second shaft 63 preventing it from rotating and when "off" it releases the second shaft. Thus, the magnetic brake 65 holds fixed the shaft 63 in response to the peak decline identifying signal, and releases the second shaft 63 in response to the peak identifying signal.

Starting with the pneumatic signal at its lowest value the push rod 41 moves to the left as the signal increases. This results in movement to the left of the connecting link 50 which results in a counterclockwise displacement of the first shaft 54 corresponding to an increasing value of the pneumatic signal. Before the peak value of the pneumatic signal is obtained the magnetic brake is in the energized state thereby preventing the second shaft 63 from rotating. However, as the connecting line 50 moves and rotates the first shaft 54 the friction clutch 64 slips and allows the first shaft 54 to move relative to the second shaft 63. When the peak value is obtained the peak identifying signal occurs and the magnetic brake 65 is de-energized allowing the system torsional stresses to normalize. Then when the pressure switch 70 opens, signaling commencement of the decline, the brake 65 is re-energized holding the second shaft 63 fixed. This shaft acts through the friction clutch 64 to hold the first shaft 54 in the peak value position throughout the declining period of the pulsating pneumatic signal and until the next peak occurs. If the subsequent peak of the pneumatic signal is greater the connecting link 50 drives the shaft 54 to a still further positive position and the friction clutch 64 slips. If the subsequent peak value of the pneumatic signal should be lower then the push rod 41 does not reach far enough to contact the extending plate 45 of the arm 44. Thus, when the peak identifying signal occurs, the magnetic brake 65 is de-energized releasing the second shaft 63 thereby enabling the first and second shafts, and the arm 44, to immediately respond to the return spring 46. The angular position of the first shaft is immediately decreased by action of the return spring until the plate 45 contacts the push rod 41 at its new peak value position. When the subsequent peak decline identifying signal occurs the magnetic brake 65 is re-energized holding both shafts in that new peak position. It can be seen that the operation of the system is such that the first shaft 54 is always in a position which corresponds to the value of the most recent peak of the pneumatic signal.

It should be noted that when a subsequent peak is of lesser value than a prior peak the position of the shaft 54 assumes the subsequent lower value position in a nearly instantaneous step-wise manner, by action of the return spring. On the other hand, when a subsequent peak is of greater value, this value is approached by the angular position of the first shaft in a more gradual manner closely following the manner of incline of that portion of the new peak which is higher than the proceeding peak.

It should also be noted that viewing the system kinematically the arm 44, the connecting link 50, and the shaft 54, can be regarded as single movable member since these elements move in unison with the push rod 41. This is clear since the angular movement of the shaft 54 can be directly obtained from the arm 44. Thus the push rod 41 can be regarded as a first movable member, the arm 44, the connecting link 50, the arm 51, and the shaft 54 can, as a group, be regarded as a second movable member, and the shaft 63 can be regarded as a third movable member. However, the use of the various parts illustrated is preferred to obtain a desired magnification of the movement provided by the pressure sensing cell 40.

For providing an output signal which corresponds to the position of the first shaft 54 the potentiometer 60 is electrically coupled to a conventional bridge network and amplifying circuit 75 which provides an electrical output signal representing the position of the first shaft 54. The electrical output signal thus provided can be used as an electrical analog signal representing the drilling mud density and it can be transmitted to an analog to digital converter 76 should the digital utilization of the signal be required. The digital conversion can be in the form of serial digital information or in the form of parallel digital information depending upon the desired use of the signal. This can be accommodated by using an appropriate analog to digital converter.

It can be appreciated by those skilled in the art that the conversion of the pneumatic signal to the reciprocating linear movement of the link 50 discussed above can be replaced by a conversion directly to reciprocating angular movement by utilizing an appropriate pressure sensing cell, such as, for example, a spiral type cell. Also, the angular movement of the second movable member discussed above can be replaced by linear movement of a sliding member since angular movement is not a limiting factor to the fundamental principle of the invention.

It can also be appreciated by those skilled in the art that various speed multiplying or reducing elements can be added to, or substituted for, the elements of the basic system discussed above. For example, if it is desired to multiply still further the movement of the push rod 41, a gear train can readily be utilized between the first shaft 54 and the potentiometer input shaft. Thus, various speed reduction or multiplication elements can be utilized in constructing the conversion system of the invention.

While the invention has been described with a certain degree of particularity, it can, nevertheless, be seen by the examples hereinabove set forth that many modifications and variations of the invention can be made without departing from the spirit and scope thereof.

I claim:

1. In a drilling fluid density measuring aparatus which includes means for repeatedly sensing the density of a bore hole drilling fluid and for providing a pulsating pneumatic signal wherein the peak height of each pulse corresponds to the repeatedly sensed density of said fluid, the improvement for converting said pulsating pneumatic signal to a peak-holding output signal representing the peaks of said pneumatic signal comprising:

(a) pressure responsive means for sensing said pulsating pneumatic signal including a first movable member whose position is responsive to the instantaneous value of said pneumatic signal whereby said first member is caused to move in accordance with the inclining and declining periods of said pneumatic signal;

(b) a second movable member operatively coupled with said first movable member in a manner permitting said second movable member to move in a direction which corresponds to an increasing value of said pneumatic signal and permitting freedom thereof to maintain its positional displacement when said pneumatic signal is in its declining period;

(c) return means for urging movement of said second movable member in a direction which corresponds to a declining value of said pneumatic signal;

(d) signal providing means for providing a peak identifying signal when said pulsating pneumatic signal attains its peak value and for providing a decline identifying signal prior to substantial decline of said pneumatic signal from its peak value;

(e) means for alternately holding fixed and releasing said second movable member in response to said signal providing means (d) hold holding fixed said second movable member in response to said peak-decline identifying signal until a subsequent peak identifying signal occurs and thereupon for releasing it until a subsequent peak-decline identifying signal occurs; and (f) output signal generating means mechanically coupled with said second movable member for generating an output signal corresponding to the position thereof; whereby said output signal is a peak-holding signal corresponding to the position of said second movable member which holds a position corresponding to a peak value of said pneumatic signal and when a subsequent peak is obtained said second movable member upon said releasing and urged by said return means assumes a position corresponding to said subsequent peak.

2. In a drilling fluid density measuring apparatus which includes means for repeatedly sensing the density of a borehole drilling fluid and for providing a pulsating pneumatic signal wherein the peak height of each pulse corresponds to the repeatedly sensed density of said fluid, the improvement for converting said pulsating pneumatic signal to a peak-holding output signal representing the peaks of said pneumatic signal comprising:

(a) pressure responsive means for sensing said pulsating pneumatic signal including a first movable member whose position is responsive to the instantaneous value of said pneumatic signal whereby said first member is caused to move in accordance with the inclining and declining periods of said pneumatic signal;

(b) a second movable member operatively coupled with said first movable member in a manner permitting said second movable member to move in a direction which corresponds to an increasing value of said pneumatic signal and permitting freedom thereof to maintain its positional displacement when said pneumatic signal is in its declining period;

(c) a third movable member;

(d) clutch means coupling said second movable member with said third movable member for restraining relative movement between said second and third movable members;

(e) return means for urging movement of said second movable member in a direction which corresponds to a declining value of said pneumatic signal;

(f) signal providing means for providing a peak identifying signal when said pulsating pneumatic signal attains its peak value and for providing a decline identifying signal prior to substantial decline of said pneumatic signal from its peak value;

(g) automatic coupling means responsive to said signal provding means (f) for holding fixed said third movable member in response to said decline identifying signal and for releasing said third movable member in response to said peak identifying signal; and (h) output signal generation means mechanically couples with said second movable member for generating an output signal corresponding to the position thereof; whereby said output signal is a peak-holding signal corresponding to the position of said second movable member which holds a position corresponding to a peak value of said pneumatic signal, when a subsequent peak thereof occurs which is of greater value said clutch means permits said second movable member to assume a position corresponding to said greater value peak, and when a subsequent peak of less value occurs said second and third movable members are permitted to respond to said return means upon release by said automatic coupling means to assume a position corresponding to said less value peak.

3. In a drilling fluid density measuring apparatus which includes means for repeatedly sensing the density of a borehole drilling fluid and for providing a pulsating pneumatic signal wherein the peak height of each pulse corresponds to the repeatedly sensed density of said fluid, the improvement for converting said pulsating pneumatic signal to a peak-holding output signal representing the peaks of said pneumatic signal comprising:

(a) pressure responsive means for sensing said pulsating pneumatic signal including a first movable member whose position is responsive to the instantaneous value of said pneumatic signal whereby said first member is caused to move in accordance with the inclining and declining periods of said pneumatic signal;

(b) a housing;

(c) a second movable member movably mounted in said housing and operatively coupled with said first movable member in a manner permitting said second movable member to move in a direction which corresponds to an increasing value of said pneumatic signal and permitting freedom thereof to maintain its positional displacement when said pneumatic signal is in its declining period;

(d) a third movable member movably mounted in said housing;

(e) a friction clutch coupling said second movable member with said third movable member for restraining relative movement between said second and third members, said friction clutch slipping to permit said relative movement corresponding to increasing values of said pneumatic signal and holding said positional displacement of said second movable member when said pulsating pneumatic signal is in its declining period;

(f) spring return means mechanically coupled with said second movable member for urging movement thereof in a direction corresponding to a declining value of said pneumatic signal;

(g) signal providing means responsive to said pulsating pneumatic signal for providing a peak identifying electrical signal when said pulsating pneumatic signal attains its peak value and for providing a decline identifying electrical signal prior to substantial decline of said pneumatic signal from its peak value;

(h) means including a magnetic brake responsive to said signal providing means (g) for holding fixed said third movable member in response to said decline identifying electrical signal and for releasing said third movable member in response to said peak identifying electrical signal; and (i) output signal generating means mechanically coupled with said second movable member for generating an output signal corresponding to the position thereof; whereby said output signal is a peak-holding signal corresponding to the position of said second movable member which holds a position corresponding to a peak value of said pneumatic signal, when a subsequent peak thereof occurs which is of greater value said friction clutch slips permitting said second movable member to assume a position corresponding to said greater value peak, and when a subsequent peak of less value occurs said second and third movable members are permitted to respond to said spring return means upon release by said magnetic brake to assume a position corresponding to said less value peak.

4. The improvement as claimed in claim 3 wherein said output signal generating means (i) includes a potentiometer mechanically coupled to said second movable member adapted to provide an electrical signal corresponding to the position of said second movable member.

5. The improvement as claimed in claim 4 wherein said output signal generating means (i) includes a regulated electrical source including a bridge network circuit coupled with said potentiometer to provide an electrical current analog signal corresponding to the position of said second movable member.

6. In a drilling fluid density measuring apparatus which periodically senses the density of a borehole drilling fluid, including a chamber adapted to receive successive charges of said drilling fluid, pressure sensing means for sensing the pressure in said chamber at two sensing points separated by a vertical distance, whereby the difference between the sensed pressures is proportional to the density of said drilling fluid when said fluid is present therein, means for cyclically charging said chamber with said drilling fluid and for cyclically emptying said chamber, and a pneumatic pressure generator operatively coupled with said pressure sensing means for generating a pneumatic signal corresponding to said sensed pressure difference, whereby said apparatus provides a periodic pulsating pneumatic signal the peak height of each respective pulse corresponding to the density of each respective charge of said drilling fluid, the improvement for providing a continuous output signal representing the peaks of said pneumatic signal in the form of a peak-holding signal, comprising:

(a) pressure responsive means for sensing said pulsating pneumatic signal including a first movable member whose position is responsive to the instantaneous value of said pneumatic signal whereby said first member is caused to move in accordance with the inclining and declining periods of said pneumatic signal;

(b) a housing;

(c) a first shaft rotatably mounted in said housing;

(d) drive means responsive to said first movable member for driving said first shaft in an angular direction which corresponds to an increasing value of said pneumatic signal and for providing freedom of said first shaft to maintain its angular displacement when said pneumatic signal is in its declining period;

(e) a second shaft rotatably mounted in said housing;

(f) a friction clutch coupling said first shaft with said second shaft for restraining relative angular movement between said first and second shafts, said friction clutch slipping to permit said relating angular movement when such movement is urged by said first movable member;

(g) spring return means operatively coupled with said first shaft for urging angular movement thereof in a direction corresponding to a declining value of said pneumatic signal;

(h) signal providing means including a pressure switch responsive to said means for cyclically charging and emptying said chamber for providing a peak identifying electrical signal identifying the attainment of a peak value of said pneumatic signal when the level of said drilling fluid in said chamber increases above the uppermost of said sensing points and for providing a peak decline identifying electrical signal when the level of said drilling fluid in said chamber declines from its peak height not below said uppermost sensing point in said chamber;

(i) means including a magnetic brake mechanically coupled with said shaft and electrically coupled with said signal providing means (h) for holding said second shaft fixed in response to said decline identifying electrical signal and for releasing said second shaft in response to said peak identifying electrical signal; and (j) output means including a potentiometer mechanically coupled with said first shaft (c) for generating an output electrical signal corresponding to the position of said first shaft;

whereby said output electrical signal is a peak-holding signal corresponding to the angular position of said first shaft which holds an angular position corresponding to a peak value of said pneumatic signal, when a subsequent peak thereof occurs which is of greater value said friction clutch slips permitting said first shaft to assume an angular position corresponding to said greater value peak, and when a subsequent peak of less value occurs said first and second shafts are permitted to respond to said spring return means upon release by said magnetic brake to assume an angular position corresponding to said less value peak.

7. The improvement as claimed in claim 6 wherein said output means (j) includes means for providing said output electrical signal in a form of an analog signal representing the position of said shaft, said improvement further comprising an analog to digital converter operatively coupled with said output means (j) for converting said analog signal to a peak-holding output digital signal.

8. A system for converting a pulsating pneumatic signal to a peak-holding electrical signal, comprising:

(a) pressure responsive means for sensing said pulsating pneumatic signal including a first movable member whose position is responsive to the instantaneous value of said pneumatic signal whereby said first member is caused to move in accordance with the inclining and declining periods of said pneumatic signal;

(b) a housing;

(c) a second movable member movably mounted in said housing and operatively coupled with said first movable member in a manner permitting said second movable member to move in a direction which corresponds to an increasing value of said pneumatic signal and permitting freedom thereof to maintain its positional displacement when said pneumatic signal is in its declining period;

(d) a third movable member movably mounted in said housing;

(e) a friction clutch coupling said second movable member with said third movable member for restraining relative movement between said second and third members, said friction clutch slipping to permit movement therebetween corresponding to increasing values of said pneumatic signal and holding said positional displacement of said second movable member when said pulsating pneumatic signal is in its declining period;

(f) spring return means mechanically coupled with said second movable member for urging movement thereof in a direction corresponding to a declining value of said pneumatic signal;

(g) signal providing means responsive to said pulsating pneumatc signal for providing a peak identifying electrical signal when said pulsating pneumatic signal attains its peak value and for providing a decline identifying electrical signal prior to substantial decline of said pneumatic signal from its peak value;

(h) means including a magnetic brake responsive to said signal providing means (g) for holding fixed said third movable member in response to said decline identifying electrical signal and for releasing said third movable member in response to said peak identifying electrical signal; and (i) means including a potentiometer mechanically coupled to said first movable member (c) for generating an output electrical signal corresponding to the position of said first movable member; whereby said output signal is a peak-holding signal corresponding to the position of said second movable member which holds a position corresponding to a peak value of said pneumatic signal, when a subsequent peak thereof occurs which is of greater value said friction clutch slips permitting said second movable member to assume a position corresponding to said greater value peak, and when a subsequent peak of less value occurs said second and third movable members are permitted to respond to said spring return means upon release by said magnetic brake to assume a position corresponding to said less value peak.

References Cited

UNITED STATES PATENTS

| | | | |
|---|---|---|---|
| 2,655,037 | 10/1953 | Gess | 73—438 |
| 3,031,891 | 5/1962 | Power | 73—438 |
| 3,057,184 | 10/1962 | Sprackely | 73—23.1 |
| 3,212,323 | 10/1965 | Thompson et al. | 73—23.1 |

RICHARD C. QUEISSER, Primary Examiner

E. J. KOCH, Assistant Examiner

U.S. Cl. X.R.

73—396